(12) United States Patent
Chishti et al.

(10) Patent No.: US 8,484,418 B2
(45) Date of Patent: Jul. 9, 2013

(54) METHODS AND APPARATUSES FOR IDLE-PRIORITIZED MEMORY RANKS

(75) Inventors: Zeshan A. Chishti, Hillsboro, OR (US); Ahmed M. Amin, West Lafayette, IN (US)

(73) Assignee: Intel Corporation, Santa Clara, CA (US)

( * ) Notice: Subject to any disclaimer, the term of this patent is extended or adjusted under 35 U.S.C. 154(b) by 322 days.

(21) Appl. No.: 12/910,285

(22) Filed: Oct. 22, 2010

(65) Prior Publication Data

US 2012/0102270 A1 Apr. 26, 2012

(51) Int. Cl.
*G06F 12/00* (2006.01)

(52) U.S. Cl.
USPC ............... 711/133; 711/118; 711/E12.001; 711/E12.022

(58) Field of Classification Search
None
See application file for complete search history.

(56) References Cited

U.S. PATENT DOCUMENTS

| 5,390,334 | A | * | 2/1995 | Harrison | 711/112 |
| 5,781,923 | A | * | 7/1998 | Hunt | 711/128 |
| 6,954,837 | B2 | * | 10/2005 | Woo et al. | 711/170 |
| 2001/0032299 | A1 | * | 10/2001 | Teramoto | 711/141 |
| 2002/0056022 | A1 | * | 5/2002 | Leung | 711/106 |
| 2007/0156946 | A1 | * | 7/2007 | Lakshmanamurthy et al. | 711/158 |
| 2008/0034234 | A1 | * | 2/2008 | Shimizu et al. | 713/300 |
| 2008/0301354 | A1 | * | 12/2008 | Bekooij | 711/100 |
| 2009/0249169 | A1 | * | 10/2009 | Bains et al. | 714/766 |

OTHER PUBLICATIONS

Hur, A Comprehensive Approach to DRAM Power Management, IEEE, 2008, pp. 305-316.
Lebeck, Power Aware Page Allocation, ACM 2000, Ninth International Conference on Architectural Support for Programming Languages and Operating Systems (ASPLOS-IX), Nov. 2000, 12 pages.

\* cited by examiner

*Primary Examiner* — Reginald Bragdon
*Assistant Examiner* — Daniel Bernard
(74) *Attorney, Agent, or Firm* — Blakely, Sokoloff, Taylor & Zafman LLP

(57) ABSTRACT

Embodiments of an apparatus to reduce memory power consumption are presented. In one embodiment, the apparatus comprises a cache memory, a memory, and a control unit. In one embodiment, the memory includes a plurality of memory ranks. The control unit is operable to select one or more memory ranks among the plurality of memory ranks to be idle-prioritized memory ranks such that access frequency to the idle-prioritized memory ranks is reduced.

16 Claims, 5 Drawing Sheets

METHODS AND APPARATUSES FOR IDLE-PRIORITIZED MEMORY RANKS

FIELD OF THE INVENTION

Embodiments of the invention relate to the field of computer systems; more particularly, to rank aware cache replacement policy.

BACKGROUND OF THE INVENTION

In general, a cache memory includes memory between a shared system memory and execution units of a processor to hold information in a closer proximity to the execution units of the processor. Caches are often identified based on their proximity from execution units of a processor. For example, a first-level (L1) cache may be close to execution units residing on the same physical processor. A computer system may also hold other cache memories, such as, a second level cache and a third level cache which reside on the processor or elsewhere in the computer system.

When a processor issues a load/store request for a data block in a cache memory, the processor checks for the data block in the cache. If the data block is not in the cache, the cache controller issues a request to the main memory, such as, for example, a Dynamic random access memory (DRAM). Upon receiving a response from the main memory, the cache controller allocates the data block into the cache. Often, selection of a cache line to replace with the newly retrieved block of data is based on a time or use algorithm, such as a Least Recently Used (LRU) cache replacement algorithm.

Dynamic random access memory (DRAM) power consumption is increasingly significant to overall platform power. DRAM chips provide several low-power operating modes, which may reduce background power when a DRAM is not servicing any request. While deeper low power modes conserve energy during idle DRAM periods, such low power modes may result in high exit latencies for the DRAM to return to the active mode.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Figure 1:
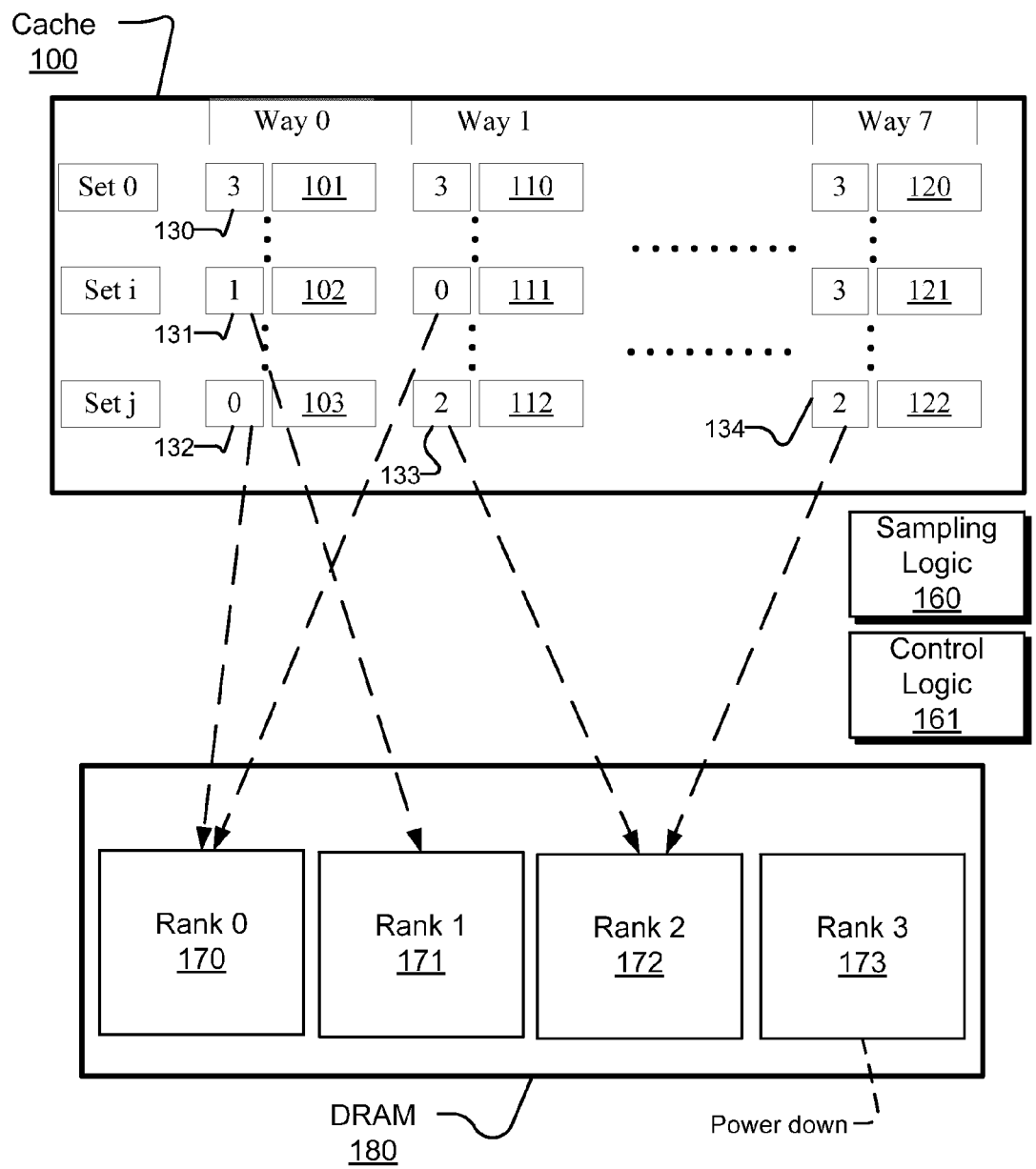
FIG. 1 is a block diagram of a memory system in accordance with one embodiment of the invention.

Embodiments of an apparatus to reduce memory power consumption are presented. In one embodiment, the apparatus comprises a cache memory, a memory, and a control unit. In one embodiment, the memory includes a plurality of memory ranks. The control unit is operable to select one or more memory ranks among the plurality of memory ranks to be idle-prioritized memory ranks such that access frequency to the idle-prioritized memory ranks is reduced.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Overview

Embodiments of an apparatus to reduce memory power consumption are presented. In one embodiment, the apparatus comprises a cache memory, a memory, and a control unit. In one embodiment, the memory includes a plurality of memory ranks. The control unit is operable to select one or more memory ranks among the plurality of memory ranks to be idle-prioritized memory ranks such that access frequency to the idle-prioritized memory ranks is reduced.

FIG. 1 is a block diagram of a memory system in accordance with one embodiment of the invention. Many related components such as buses and peripherals have not been shown to avoid obscuring the invention. Referring to FIG. 1, the memory system comprises of cache 100, sampling logic 160, control logic 161, and memory 180.

In one embodiment, the aforementioned units are shown as discrete components. Other embodiments are possible where some or all of these units are integrated within a device or within other components. In other embodiments, the aforementioned units are distributed throughout a system in hardware, software, or some combination thereof.

In one embodiment, memory 180 is a DRAM. In one embodiment, memory 180 is a multi rank memory, such as, for example, a four-rank memory. Memory 180 includes four memory ranks: rank 0 (170), rank 1 (171), rank 2 (172), and rank 3 (173).

In one embodiment, cache 100 is a multi-way cache memory which includes way 0 to way 7. In one embodiment, cache 100 includes a plurality of sets (e.g., from set 0 to set j). In one embodiment, way 0 includes multiple cache entries, such as, for example, entry 101, entry, 102, and entry 103. The number of cache entries in way 0 corresponds to the number of sets in cache 100. In one embodiment, set 0 includes cache entries from different ways, such as, for example, entry 101, entry 110, and entry 120. It will be appreciated by those skilled in the art that the number of ways and the number of sets in cache 100 may be scaled up or down. In one embodiment, cache 100 is the last level cache memory in a memory system.

In one embodiment, a cache entry is also referred to as a cache line or a cache block. In one embodiment, a cache entry is associated with a tag. For example: entry 101 is associated with tag 130, entry 102 is associated with tag 131, entry 103 is associated with tag 132, entry 112 is associated with tag 133, entry 122 is associated with tag 134, etc.

In one embodiment, a cache entry is mapped to a memory rank and is associated with a tag which contains information to which memory rank the cache entry is mapped. In one embodiment, a tag contains the number of a memory rank to which the cache entry is mapped. For example, entry 101 is mapped to rank 3, as indicated in tag 130. Entry 102 is associated with rank 1 as indicated in tag 131. In one embodiment, a tag is used to store rank address bits. For example, a tag contains a 2-bit value in a system with 4 ranks.

In one embodiment, memory 180 supports one or more low-power operating modes. Background power is reduced when memory 180 is not servicing any request and is switched to one of the low power modes. For example, low power modes include a power-down mode and a self-refresh mode. While a deeper low power mode conserve more energy during idle periods, the low power mode may result in longer exit latencies when returning to an active mode. For example, the lowest power mode for a DDR3 DRAM, referred to herein as a self-refresh mode, consumes refresh power which is about 90-95% less than active power, but uses 512 memory cycles to return to the active mode.

In one embodiment, to utilize a low power mode in an energy-efficient manner, the duration of an idle period is set such that the performance cost of exit latencies is offset by the energy savings of operating in a low power mode. In one embodiment, a memory rank (e.g., ranks 0-3) is independently controlled.

In one embodiment, high-performance systems typically distribute memory requests across multiple DRAM ranks for parallel rank access to increase memory throughput. If all the ranks are active most of the time, the idle periods are typically of short durations. In one embodiment, to avoid the performance penalty of switching from a low-power mode to an active mode, a rank is switched to a low-power mode only after a pre-determined threshold of idleness is met. As a result, if idle periods are generally short, the opportunity for any rank to use low-power modes is also smaller.

In one embodiment, control logic 161 redirects memory traffic to a group of ranks to allow other ranks to enter into low power modes for longer periods of time, thereby to increase overall energy efficiency. Control logic 161 is operable to skew memory traffic in such a way that the number of requests going to one or more ranks is reduced and the ranks stay idle for longer periods of time. In one embodiment, control logic 161 modulates DRAM traffic in such a manner that one or more DRAM ranks experience long periods of inactivity, thereby enabling the DRAM ranks to enter into low-power modes. In one embodiment, a selected rank is referred to herein as idle-prioritized memory rank or idle-prioritized rank.

In one embodiment, control logic 161 sets a replacement policy of the last-level cache (e.g., cache 100) to reshape memory traffic by favoring requests going to some ranks, allowing other ranks (e.g., an idle-prioritized rank) to remain idle for longer periods of time. Consequently, an idle-prioritized rank enters into a low power mode more often and remains in the low power mode for longer periods of time than a non-idle-prioritized rank does.

In one embodiment, control logic 161 sets rank 3 as an idle-prioritized rank. As a result, rank 3 enter into a low power mode (e.g., power down). In one embodiment, control logic 161, in conjunction with a cache replacement policy, prevents replacement of cache blocks that are mapped to a rank (e.g., rank 3 from cache 100). For example, entry 101 associated with rank 3 is not considered as a replacement candidate by the cache replacement policy. Entry 102 mapped to rank 1, entry 122 mapped to rank 2, entry 102 mapped to rank 1, and entry 103 mapped to rank 0 are considered as replacement candidates and processed in a normal manner.

In one embodiment, rank prioritization reduces the probability of incurring a cache miss for blocks mapped to that rank, therefore reducing the chances of sending a request (or to activate that rank) to service the cache miss. However, if a rank is prioritized for a very long duration, then stale cache blocks mapping to the rank would pollute the cache and increase the cache miss ratio. Therefore, in one embodiment, control logic 161, after a period of time (referred to herein as "epoch"), switches the prioritization from one rank (e.g., rank 3) to another rank (e.g., rank 1). In one embodiment, control logic 161 selects one or more idle-prioritized ranks in a round-robin manner.

Embodiments

In one embodiment, control logic 161 alters the number of idle-prioritized ranks during an epoch. More idle-prioritized ranks may lead to more power savings but, at the cost of more stale cache blocks causing a higher increase in cache miss ratios. In one embodiment, control logic 161 determines the number of idle-prioritized ranks such that the power savings offset the effect of increased miss ratios, and result in better net energy efficiency.

In one embodiment, control logic 161 selects which ranks are to be prioritized during an epoch, based at least on the rank utilization characteristics of an application. The selection is performed such that the overall power consumption of the DRAM system is reduced with lower performance impact.

In one embodiment, control logic 161 tracks the impact of rank prioritization on the performance. Control logic 161 then enables or disables the rank prioritization feature accordingly. In one embodiment, sampling logic 160 runs a sampling phase on a periodic basis. A sampling phase includes two intervals. Rank prioritization is enabled in the first interval and is disabled in the second interval. Cache miss ratios are calculated for each interval separately. In one embodiment, if the difference in cache miss ratios exceeds a threshold value, then control logic 161 disables rank prioritization until the next sampling phase. Otherwise, control logic 161 enables rank prioritization.

In one embodiment, the mapping of a cache entry to a memory rank is not stored in the tag associated with the cache entry. Address mapping translation is performed to determine which rank a cache entry is mapped to. In one embodiment, address mapping translation is performed in conjunction with tag match circuitry.

In one embodiment, a threshold value, a pre-determined value, the duration of an interval, or other setting value is determined in conjunction with a power saving profile, an operating system, a user configuration setting, or combinations thereof.

The method and apparatus described herein is primarily discussed in reference to a last-level cache. However, the method and apparatus may be implemented on or in association with other cache memories. In addition to multi-core processor computer systems, the method and apparatus may be implemented on or in association with any integrated circuit device or system, such as cell phones, personal digital assistants, embedded controllers, mobile platforms, desktop platforms, and server platforms, as well as in conjunction with other resources, such as hardware/software threads.

Figure 2:
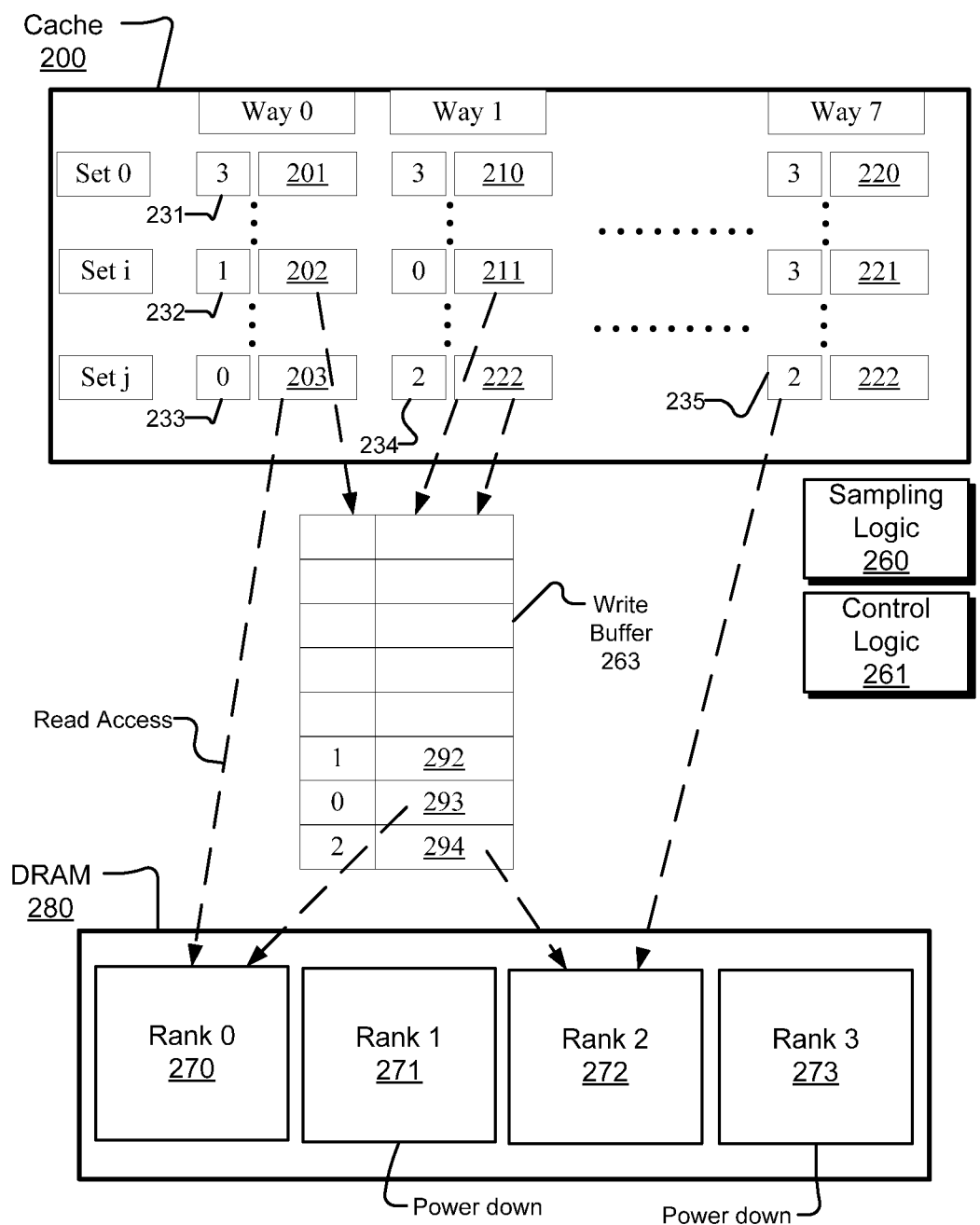
FIG. 2 is a block diagram of a memory system including a rank aware write buffer in accordance with one embodiment of the invention.

FIG. 2 is a block diagram of a memory system including a rank aware write buffer in accordance with one embodiment of the invention. Many related components such as buses and peripherals have not been shown to avoid obscuring the invention. Referring to FIG. 2, the memory system comprises of cache 200, sampling logic 260, control logic 261, write buffer 263, and memory 280.

In one embodiment, the aforementioned units are shown as discrete components. Other embodiments are possible where some or all of these units are integrated within a device or within other components. In other embodiments, the aforementioned units are distributed throughout a system in hardware, software, or some combination thereof.

In one embodiment, memory 280 is a DRAM. In one embodiment, memory 280 is a multi rank memory, such as, for example, a four-rank memory. Memory 280 includes four memory ranks: rank 0 (270), rank 1 (271), rank 2 (272), and rank 3 (273).

In one embodiment, cache 200 is a multi-way cache memory which includes way 0 to way 7. In one embodiment, cache memory 200 includes a plurality of sets (e.g., from set 0 to set j). In one embodiment, way 0 includes multiple cache entries, such as, for example, entry 201, entry, 202, and entry 203. In one embodiment, cache 200 is similar to cache 100. It will be appreciated by those skilled in the art that the number of ways and the number of sets in cache 200 may be scaled up or down. In one embodiment, cache 200 is the last level cache memory in a memory system.

In one embodiment, a cache entry is mapped to a memory rank and is associated with a tag which contains information to which memory rank the cache entry is mapped. For example, entry 201 is mapped to rank 3, as indicated in tag 231. Entry 202 is associated with rank 1 as indicated in tag 232.

In one embodiment, control logic 261 and sampling logic 260 are operable to perform operations similar to those by control logic 161 and sampling logic 160 (with respect to FIG. 1).

In one embodiment, write buffer 263 is also referred to as a rank aware write buffer or a rank coalescing write buffer. In general, a write operation to memory causes small impact on the processor performance. In one embodiment, control logic 261 delays a write request by storing the write request in a buffer between the last level cache (e.g., cache 200) and memory 280.

In one embodiment, write operations are selectively retired from write buffer 263 and sent to memory 280 in conjunction with a policy. If there are more than a pre-determined number of write operations going to the same rank and the rank is active (or about to be active), all write operations going to the rank are sent to the memory as a batch. Otherwise, the write operations remain in write buffer 263 until the condition is met or until a timer expires. The buffering ensures that the idle-prioritized rank that is powered down will not be activated for non-critical write requests.

Figure 3:
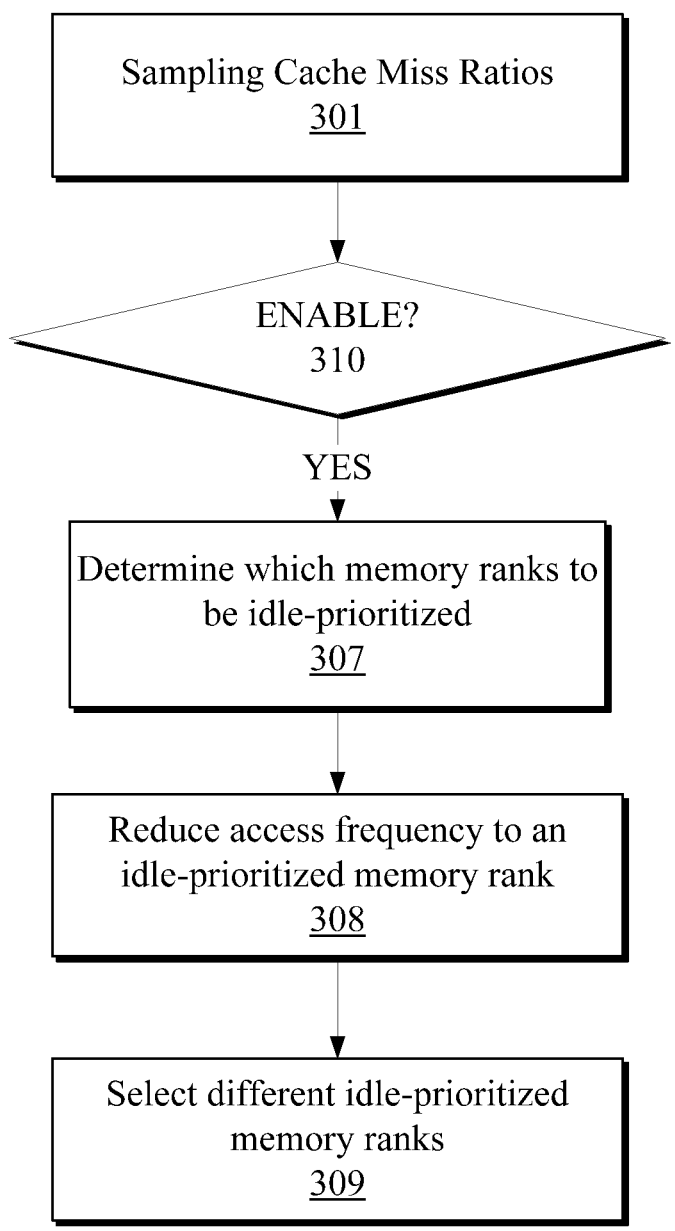
FIG. 3 is a flow diagram of one embodiment of a process to reduce power consumption of a memory system.

In one embodiment, for example, control logic 261 sets rank 1 and rank 3 as the idle-prioritized memory ranks Referring to FIG. 3, rank 1 and rank 3 enter into low power modes. Entry 211 is to be written back to rank 0. Control logic 161 stores entry 211 into write buffer 263 as entry 293. Subsequently, entry 293 is propagated to rank 0. Entry 202 is associated with rank 1 which is an idle-prioritized rank in the current epoch. Entry 202 remains in write buffer 263 as entry 292 until the number of write operations is more than a pre-determined number and rank 1 is active. Other memory accesses (e.g., read operation in conjunction with entry 203) are performed in a normal manner.

FIG. 3 is a flow diagram of one embodiment of a process to reduce power consumption of a memory system. The process is performed by processing logic that may comprise hardware (circuitry, dedicated logic, etc.), software (such as one that is run on a general purpose computer system or a dedicated machine), or a combination of both. In one embodiment, the process is performed in conjunction with control and sampling logic (e.g., control logic 161 and sampling logic 160 with respect to FIG. 1). In one embodiment, the process is performed by a computer system with respect to FIG. 5.

Referring to FIG. 3, in one embodiment, processing logic begins by sampling cache miss ratios in a sampling phase (process block 301). Processing logic determines sampling results from a first sampling interval during which rank prioritization is enabled and a second sampling interval during which the rank prioritization is disabled. The sampling results include at least cache miss ratios In one embodiment, processing logic determines whether to enable rank prioritization based at least on the sampling results (process block 310).

In one embodiment, processing logic determines which one or more memory ranks to assign as idle-prioritized memory ranks (process block 307). Processing logic determines the number of memory ranks selected as idle-prioritized memory ranks based at least on rank utilization characteristics.

In one embodiment, processing logic reduces access frequency to an idle-prioritized memory rank (process block 308). The idle-prioritized memory ranks enter a low power mode for a longer time period than other memory ranks do. Processing logic increases a contiguous duration for which the idle-prioritized memory ranks are idle. In one embodiment, processing logic prevents replacement of cache blocks of a cache memory which are mapped to the idle-prioritized memory ranks. In one embodiment, processing logic determines when to write data from a rank-aware write buffer into a memory rank based on the number of write operations associated with the memory rank and whether or not the memory rank is active In one embodiment, processing logic selects a different set of idle-prioritized memory ranks in a next epoch (process block 309). Processing logic sets the idle-prioritized memory ranks to become non-idle-prioritized memory ranks and selects different one or more idle-prioritized memory ranks after an epoch.

Embodiments of the invention may be implemented in a variety of electronic devices and logic circuits. Furthermore, devices or circuits that include embodiments of the invention may be included within a variety of computer systems.

Embodiments of the invention may also be included in other computer system topologies and architectures.

Figure 4:
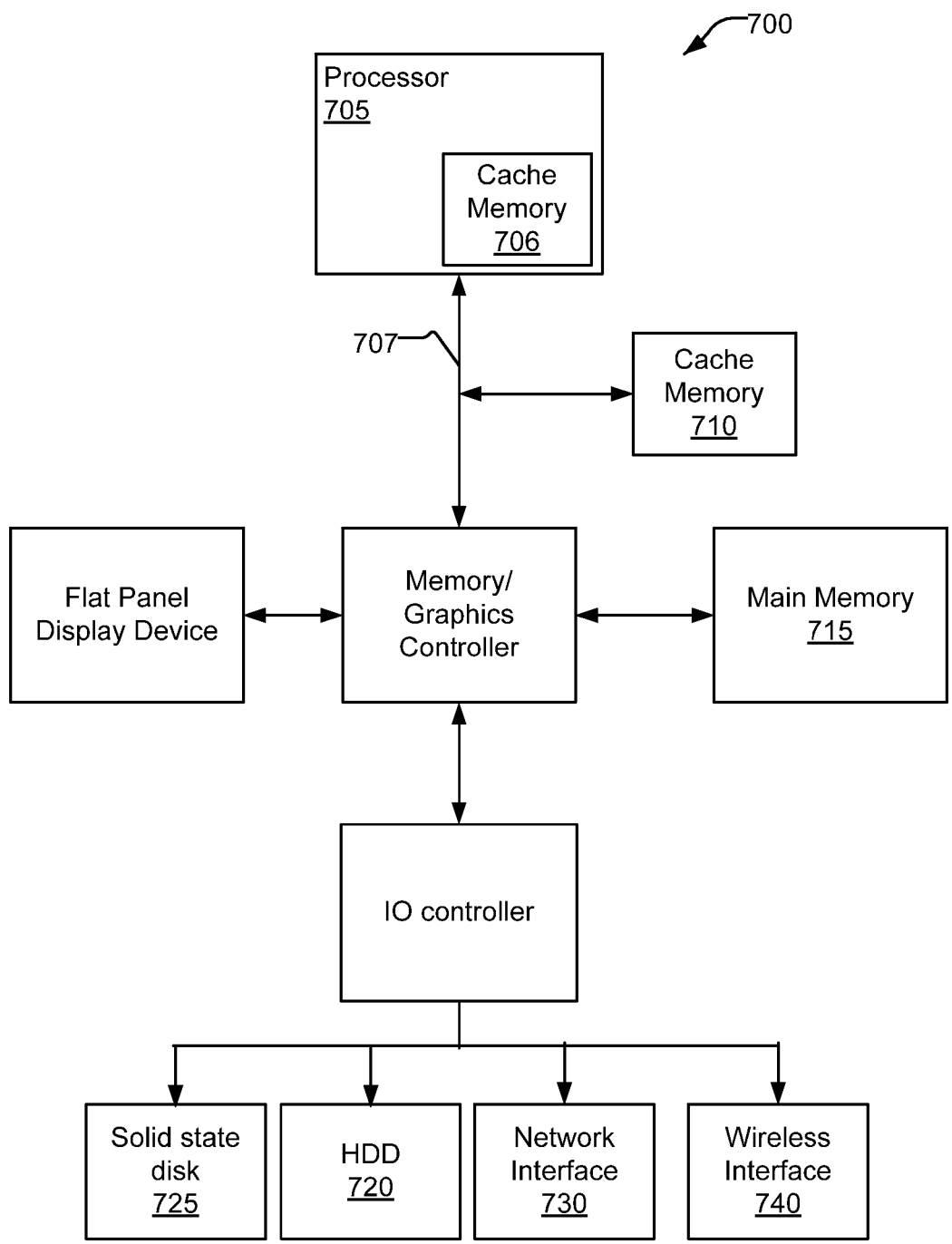
FIG. 4 illustrates a computer system for use with one embodiment of the present invention.

FIG. 4, for example, illustrates a computer system in conjunction with one embodiment of the invention. Processor 705 accesses data from level 1 (L1) cache memory 706, level 2 (L2) cache memory 710, and main memory 715. In other embodiments of the invention, cache memory 706 may be a multi-level cache memory comprising an L1 cache together with other memory such as an L2 cache within a computer system memory hierarchy and cache memory 710 are the subsequent lower level cache memory such as an L3 cache or more multi-level cache. Furthermore, in other embodiments, the computer system may have cache memory 710 as a shared cache for more than one processor core.

Processor 705 may have any number of processing cores. Other embodiments of the invention, however, may be implemented within other devices within the system or distributed throughout the system in hardware, software, or some combination thereof.

Main memory 715 may be implemented in various memory sources, such as dynamic random-access memory (DRAM), hard disk drive (HDD) 720, solid state disk 725 based on NVRAM technology, or a memory source located remotely from the computer system via network interface 730 or via wireless interface 740 containing various storage devices and technologies. The cache memory may be located either within the processor or in close proximity to the processor, such as on the processor's local bus 707. Furthermore, the cache memory may contain relatively fast memory cells, such as a six-transistor (6T) cell, or other memory cell of approximately equal or faster access speed.

Other embodiments of the invention, however, may exist in other circuits, logic units, or devices within the system of FIG. 4. Furthermore, other embodiments of the invention may be distributed throughout several circuits, logic units, or devices illustrated in FIG. 4.

Figure 5:
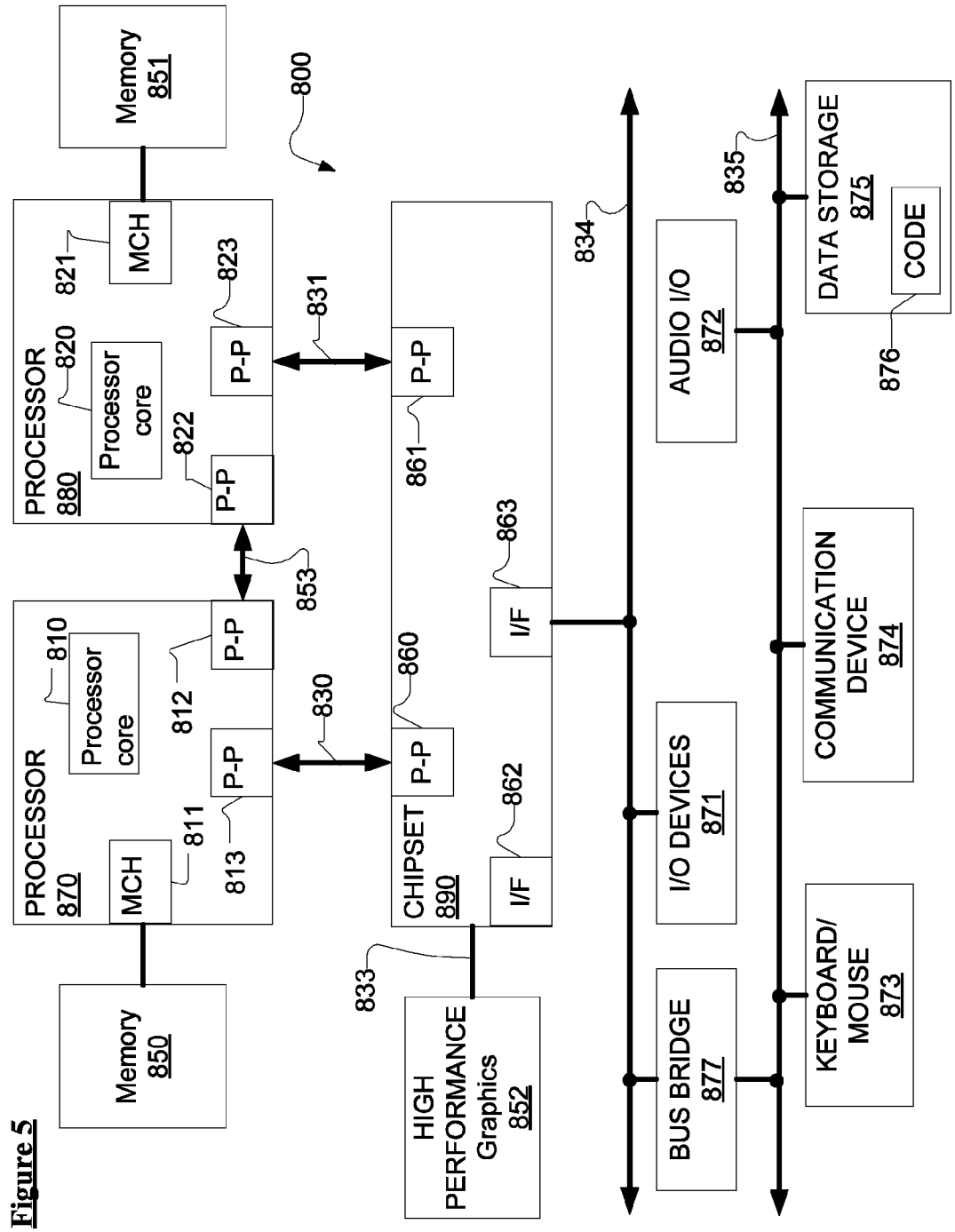
FIG. 5 illustrates a point-to-point computer system for use with one embodiment of the invention.

Similarly, at least one embodiment may be implemented within a point-to-point computer system. FIG. 5, for example, illustrates a computer system that is arranged in a point-to-point (PtP) configuration. In particular, FIG. 5 shows a system where processors, memory, and input/output devices are interconnected by a number of point-to-point interfaces.

The system of FIG. 5 may also include several processors, of which only two, processors 870, 880 are shown for clarity. Processors 870, 880 may each include a local memory controller hub (MCH) 811, 821 to connect with memory 850, 851. Processors 870, 880 may exchange data via a point-to-point (PtP) interface 853 using PtP interface circuits 812, 822. Processors 870, 880 may each exchange data with a chipset 890 via individual PtP interfaces 830, 831 using point to point interface circuits 813, 823, 860, 861. Chipset 890 may also exchange data with a high-performance graphics circuit 852 via a high-performance graphics interface 862. Embodiments of the invention may be coupled to computer bus (834 or 835), or within chipset 890, or coupled to data storage 875, or coupled to memory 850 of FIG. 5.

Other embodiments of the invention, however, may exist in other circuits, logic units, or devices within the system of FIG. 5. Furthermore, other embodiments of the invention may be distributed throughout several circuits, logic units, or devices illustrated in FIG. 5.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. An apparatus comprising:
   a cache memory;
   a memory, coupled to the cache memory, comprising a plurality of memory ranks; and
   a control unit to determine one or more memory ranks among the plurality of memory ranks to be idle-prioritized memory ranks such that access frequency to the idle-prioritized memory ranks is reduced, the control unit to determine whether to enable rank prioritization based at least on sampling results from a first sampling interval during which the rank prioritization is enabled and a second sampling interval during which the rank prioritization is disabled, wherein the sampling results include at least cache miss ratios.

2. The apparatus of claim 1, wherein the control unit is operable to select one idle-prioritized memory rank in an epoch.

3. The apparatus of claim 1, wherein the control unit is operable to prevent replacement of cache blocks which are mapped to the idle-prioritized memory ranks.

4. The apparatus of claim 1, wherein the cache memory includes a plurality of cache blocks, wherein a cache block is associated with a cache tag indicative of to which memory rank the cache block is mapped.

5. The apparatus of claim 1, wherein the idle-prioritized memory ranks enter into a low power mode for a longer time period than other memory ranks do.

6. The apparatus of claim 1, wherein the control unit is operable to increase a contiguous duration for which the idle-prioritized memory ranks are idle.

7. The apparatus of claim 1, wherein the control unit is operable to set the idle-prioritized memory ranks to become non-idle-prioritized memory ranks and to select different one or more idle-prioritized memory ranks after an epoch.

8. The apparatus of claim 1, wherein the control unit is operable to determine the number of memory ranks selected as idle-prioritized memory ranks based at least on rank utilization characteristics, wherein the control unit is operable to determine a duration of an epoch based at least on the rank utilization characteristics and cache miss ratios.

9. The apparatus of claim 1, further comprising a rank-aware write buffer, wherein the control unit is operable to determine when to write data from the rank-aware write buffer into a memory rank, based at least on a number of write operations associated with the memory rank and whether or not the memory rank is active.

10. A system comprising:
    a processor;

a cache memory;

a memory, coupled to the processor, comprising a plurality of memory ranks, wherein the processor is operable to select one or more idle-prioritized memory ranks among the plurality of memory ranks; and a control unit coupled with the memory, the control unit to determine one or more memory ranks among the plurality of memory ranks to be idle-prioritized memory ranks such that access frequency to the idle-prioritized memory ranks is reduced, the control unit to determine whether to enable rank prioritization based at least on sampling results from a first sampling interval during which the rank prioritization is enabled and a second sampling interval during which the rank prioritization is disabled, wherein the sampling results include at least cache miss ratios.

11. The system of claim 10, wherein the processor is operable to prevent replacement of cache blocks which are mapped to the idle-prioritized memory ranks.

12. The system of claim 10, wherein the idle-prioritized memory ranks remain in a low power mode longer than other memory ranks do.

13. The system of claim 10, further comprising a rank-aware write buffer to store data temporarily before the data is written to a memory rank.

14. A method comprising:
determining which one or more memory ranks to be set as idle-prioritized memory ranks;
preventing replacement of cache blocks which are mapped to the idle-prioritized memory ranks; and
determining whether to enable rank prioritization based at least on sampling results from a first sampling interval during which the rank prioritization is enabled and from a second sampling interval during which the rank prioritization is disabled.

15. The method of claim 14, further comprising increasing a contiguous duration for which the idle-prioritized memory ranks remain in a low power mode.

16. The method of claim 14, further comprising writing data from a rank-aware write buffer into a memory rank if the memory rank is active and if the number of write operations to be performed is more than a first number.

* * * * *